United States Patent
Walker

(10) Patent No.: US 9,042,467 B2
(45) Date of Patent: May 26, 2015

(54) METHOD TO INCREASE SIGNAL-TO-NOISE RATIO OF A CYCLIC-PREFIX ORTHOGONAL FREQUENCY-DIVISION MULTIPLEX SIGNAL

(71) Applicant: DELPHI TECHNOLOGIES, INC., Troy, MI (US)

(72) Inventor: Glenn A. Walker, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 99 days.

(21) Appl. No.: 13/874,506

(22) Filed: May 1, 2013

(65) Prior Publication Data

US 2014/0328439 A1    Nov. 6, 2014

(51) Int. Cl.
H04L 27/26    (2006.01)

(52) U.S. Cl.
CPC ............ *H04L 27/2607* (2013.01); *H04L 27/26* (2013.01)

(58) Field of Classification Search
CPC ............... H04L 27/2607; H04L 25/03821; H04L 27/2647; H04L 27/2605; H04L 27/2657; H04L 25/03006; H04L 25/03019; H04L 27/2672; H04L 27/06; H04B 10/60; H04B 10/697; H04W 56/00
USPC .......... 375/316, 340, 324, 325; 370/203, 208, 370/210; 708/100, 200, 403, 404
See application file for complete search history.

(56) References Cited

U.S. PATENT DOCUMENTS 7,729,414 B2    6/2010  Parker
7,773,683 B2 *  8/2010  Tseng et al. .................. 375/260
7,991,058 B2    8/2011  Setoh et al.
2004/0190440 A1    9/2004  Kim et al.
2011/0080967 A1 *  4/2011  Larsson et al. ................ 375/260

OTHER PUBLICATIONS

Steendam, et al: "Different Guard Interval Techniques for OFDM: Performance Comparison", Published in Multi-Carrier Spread Spectrum 2007, Lecture Notes Electrical Engineering vol. 1, 2007, pp. 11-24 Published by Springer Publishing, 14 pages.
Lee J, et al: "Double Window Cancellation and Combining for OFDM in Time-Invariant Large Delay Spread Channel", IEICE Transactions on Fundamentals of Electronics, Communications and Computer Sciences, Engineering Sciences Society, Tokyo, JP, vol. E90A, No. 10, Oct. 1, 2007 , pp. 2066-2078, XO001508640, ISSN: 0916-8508, DOI:10.1093/IETFEC/E90-A.102066* p. 2066-p. 2071; figures 9-12 *.
European Search Report dated Nov. 10, 2014.

* cited by examiner

Primary Examiner — Vineeta Panwalkar
(74) Attorney, Agent, or Firm — Lawrence D. Hazelton

(57) ABSTRACT

A method to decode an orthogonal frequency-division multiplex (OFDM) signal data block that includes symbol-data in a data interval, repeated-data in a cyclic-prefix (CP) guard interval, and noise. The signal is often called a CP-OFDM signal. The method includes determining a first data set based on data samples taken during a first time window of a data block. The method also includes determining a second data set based on data samples taken during a second time window of the data block, wherein the second time window is selected so that the second data set includes repeated-data not present in the first data set. The method also includes combining the first data set and the second data set in a manner effective to increase a signal-to-noise ratio of the signal. The combining process increases signal data energy more than noise data energy.

13 Claims, 4 Drawing Sheets

US 9,042,467 B2

METHOD TO INCREASE SIGNAL-TO-NOISE RATIO OF A CYCLIC-PREFIX ORTHOGONAL FREQUENCY-DIVISION MULTIPLEX SIGNAL

TECHNICAL FIELD OF INVENTION

This disclosure generally relates to a method to decode an orthogonal frequency-division multiplex (OFDM) signal, and more particularly relates to using repeated-data in a cyclic-prefix (CP) guard interval to increase a signal-to-noise ratio of the signal.

BACKGROUND OF INVENTION

Orthogonal frequency-division multiplexing (OFDM) waveforms have been used successfully in various communication systems including terrestrial only systems, hybrid terrestrial/satellite systems, and satellite only systems. OFDM signals typically include a guard interval to reduce the effects of multipath interference, in particular inter-symbol interference (ISI) caused by temporally distinct symbols arriving at a receiver at the same time. A commonly used guard interval is the so-called cyclic prefix (CP) guard interval. The guard intervals of CP-OFDM signals repeat or replicate a portion of the symbol-data being transmitted. However, since the energy or information in the CP guard interval is typically discarded by a receiver as it is presumed to be affected by ISI, a CP-OFDM based system suffers from a signal energy efficiency loss. For example, if a CP-OFDM signal employs a one-quarter (¼) guard interval, the transmitted signal includes 25% of the usable data replicated and added to the original usable data. This means that the time to transmit the usable data takes 125% of the time actually needed, and only 100/125 or 80% of the transmitted signal energy is used to decode data from the received signal.

SUMMARY OF THE INVENTION

In accordance with one embodiment, a method to decode an orthogonal frequency-division multiplex (OFDM) signal data block is provided. The data block includes symbol-data in a data interval, repeated-data in a cyclic-prefix (CP) guard interval, and noise. The signal is characterized as a CP-OFDM signal. The method includes the step of determining a first data set based on data samples taken during a first time window of a data block. The method also includes the step of determining a second data set based on data samples taken during a second time window of the data block. The second time window is selected so that the second data set includes repeated-data not present in the first data set. The method also includes the step of combining the first data set and the second data set in a manner effective to increase a signal-to-noise ratio of the signal.

In one alternative embodiment, the step of combining the first data set and the second data set includes time-aligning the repeated-data of the second data set not present in the first data set with the corresponding symbol data of the first data set, and determining a maximal ratio combining (MRC) of the first data set and the second data set.

In another alternative embodiment, the step of combining the first data set and the second data set includes determining a first fast Fourier transform (first FFT) of the first data set, determining a second fast Fourier transform (second FFT) of the second data set, and determining a maximal ratio combining (MRC) of the first FFT and the second FFT.

In another embodiment, a receiver configured to decode an orthogonal frequency-division multiplex (OFDM) signal is provided. The signal includes symbol-data in a data interval, repeated-data in a cyclic-prefix (CP) guard interval, and noise. The signal is characterized as a CP-OFDM signal. The receiver includes a memory and a processor. The memory is configured to store a first data set based on data samples taken during a first time window of a data block, and store a second data set based on data samples taken during a second time window of the data block. The second time window is selected so that the second data set includes repeated-data not present in the first data set. The processor is configured to combine the first data set and the second data set in a manner effective to increase a signal-to-noise ratio of the signal.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Described herein is a method to process an orthogonal frequency-division multiplex with a cyclic-prefix guard interval (CP-OFDM) signal to increase a signal-to-noise ratio of the signal. As will be described in more detail below, the method takes advantage of the fact that the noise received in the cyclic-prefix (CP) guard interval and the noise received in the portion of the data-interval that was replicated in the CP guard interval are not correlated. If the energy in the received data from the CP guard interval and the data-interval replicated in the CP guard interval are combined as set forth below, the energy of the symbol component relative to the noise component is increased. That is, the signal-to-noise ratio is increased.

Figure 1:
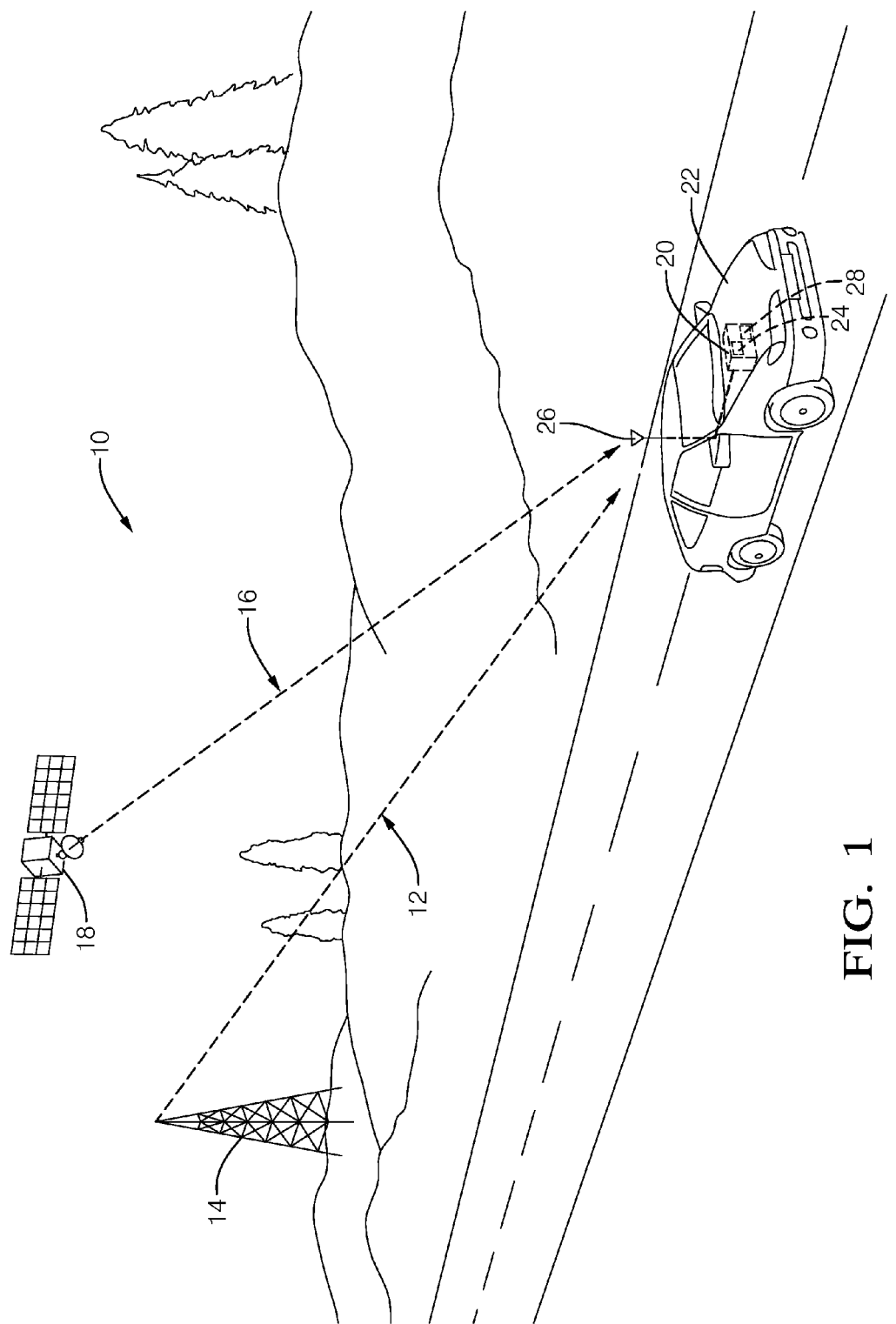
FIG. 1 is a perspective view of a communication system in accordance with one embodiment.

FIG. 1 illustrates a non-limiting example of a communication system, hereafter the system 10. The system 10 is generally configured to communicate a terrestrial signal 12 broadcast by a terrestrial transmitter 14 and/or a satellite signal 16 broadcast by a satellite transmitter 18. The system 10 includes a broadcast receiver, hereafter the receiver 20. In this non-limiting example, the receiver 20 is illustrated as being installed in a vehicle 22. However, the teachings presented herein are also applicable to receivers adapted for other situations such as a hand held receiver configured to receive video broadcast signals, or a portable receiver configured to receive audio and/or digital data broadcast signals The receiver 20 may be configured to receive both the terrestrial signal 12 and/or the satellite signal 16. However, it is not necessary for the receiver 20 to receive both the terrestrial signal 12 and the satellite signal 16 to output a receiver signal (not shown). For example, if the receiver 20 is located in a rural area, only the satellite signal 16 may be available and so the receiver may output a receiver signal based only on the satellite signal 16. Conversely, if the receiver 20 is located in an urban area where the satellite signal 16 is blocked by a building or roadway overpass (e.g. the vehicle traveling under a bridge or in a multilevel parking structure), the receiver 20 may output a receiver signal based only on the terrestrial signal 12.

The receiver 20 may include a processor 24 configured to process terrestrial data received from or extracted from the terrestrial signal 12, and satellite data received from or extracted from the satellite signal 16. The processor 24 may include a microprocessor or other control circuitry as should be evident to those in the art. One or more routines may be executed by the processor 24 to perform steps for determining (i.e. decoding, demodulating, sampling, etc.) signals received by an antenna 26 coupled to the receiver 20 as described herein.

The receiver 20 may include a memory 28 coupled to the processor 24. In general, the memory 28 is used to store a variety of data including, but not limited to terrestrial data from the terrestrial signal 12 and/or the satellite data from the satellite signal 16. By way of example and not limitation, the memory 28 may be configured to store samples of the terrestrial signal 12 and/or the satellite data from the satellite signal 16 for further processing by the processor 24.

Figure 2:
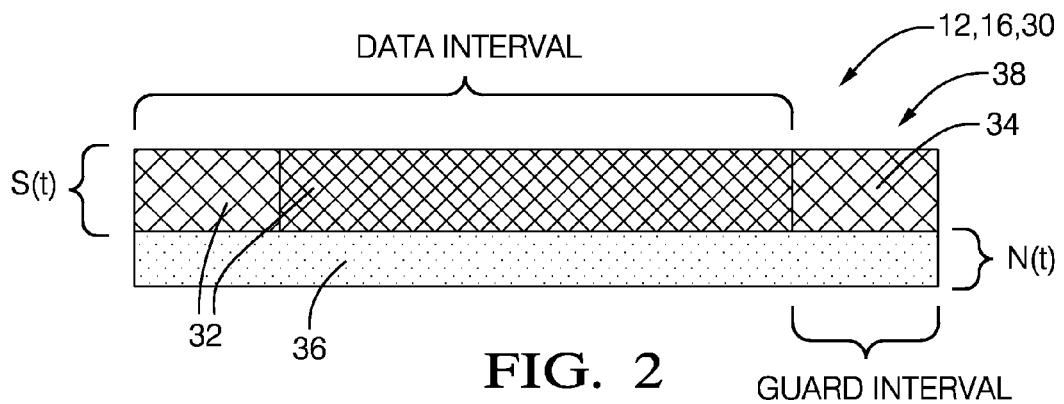
FIG. 2 is diagram of a signal present in the system of FIG. 1 in accordance with one embodiment.

FIG. 2 is a non-limiting illustration of the terrestrial signal 12 and/or the satellite signal 16 as received by the receiver 20. In general, the terrestrial signal 12 and/or the satellite signal 16 are an orthogonal frequency-division multiplex (OFDM) type signal, hereafter the signal 30. In general, the signal 30 that is received by the receiver 20 includes symbol-data 32 in a data interval, and repeated-data 34 in a cyclic-prefix (CP) guard interval. The combination of the symbol-data 32 and the repeated-data 34 is designated as a symbol portion S(t), and the illustrated height of the symbol portion S(t) at any point in time (t) may be interpreted as a relative measure of signal energy at time (t). It should be recognized that the differently shaded portions at each end of the symbol portion S(t) are duplications of the same data or information in accordance with standard practices for adding CP guard intervals to transmitted signals. It should also be recognized that an alternative practice may be to place the guard interval at the beginning (left end) of the signal 30 which is a replication of symbol data located at the end (right end) of the data interval.

The signal 30 also generally includes noise 36 designated as a noise portion N(t). Similar to the symbol portion S(t), the illustrated height of the noise portion N(t) at any point in time (t) may be interpreted as a relative measure of noise energy at time (t). Accordingly, the relative height difference of the symbol portion S(t) and the noise portion N(t) may be interpreted as indicative of a signal-to-noise ratio of the signal 30. By way of example and not limitation, the noise portion N(t) is commonly characterized as additive Gaussian white noise (AWGN), and the signal 30 is commonly characterized as a CP-OFDM signal. The combination of the entire signal portion S(t) and the noise portion N(t) is referred to herein as a data block 38, and is understood to be one of a sequence or series of data blocks received by the receiver 20.

Figure 3:
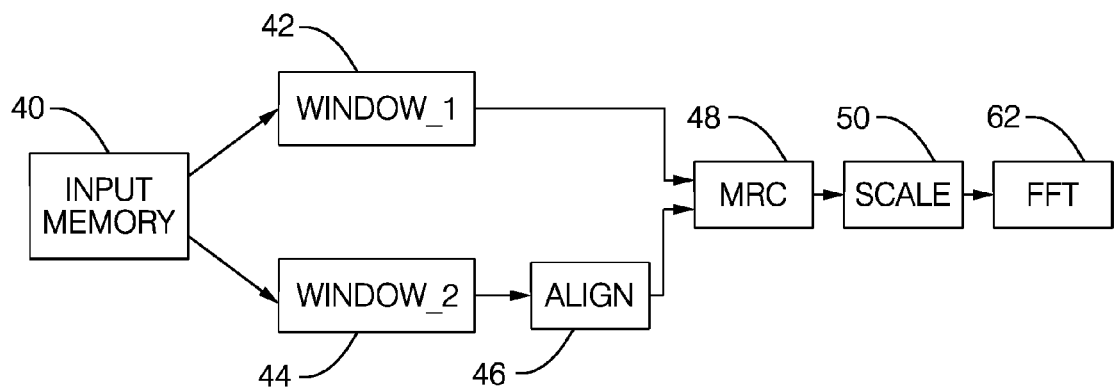
FIG. 3 is signal processing diagram for a receiver of the system of FIG. 1 in accordance with one embodiment.

FIGS. 3-6 illustrate one embodiment of the system and method described herein. FIG. 3 illustrates a conceptual data flow diagram of how data may be stored in the memory 28 (FIG. 1) and processed by the processor 24 (FIG. 1). An INPUT→MEMORY 40 may include, but is not limited to, the antenna 26 feeding an antenna signal into an tuner (not shown) followed by an analog-to-digital converter (ADC) that sends samples the signal 30 to the memory 28. Typically, the memory 28 is configured to store the data in the order that the data was sampled so that blocks or windows of data can be selectively recalled from the memory 28 for further processing by the processor 24. By way of further example and not limitation, the data block 38 may be formed of 1280 data samples and may be represented by $$DB(t)=[S(t)+N(t)]*[U(t-0)-U(t-1280)], \quad \text{Eq. 1}$$

where DB(t) corresponds to the signal 30 present in the data block 38, and U(t) is the well-known unit step function.

Figure 4:
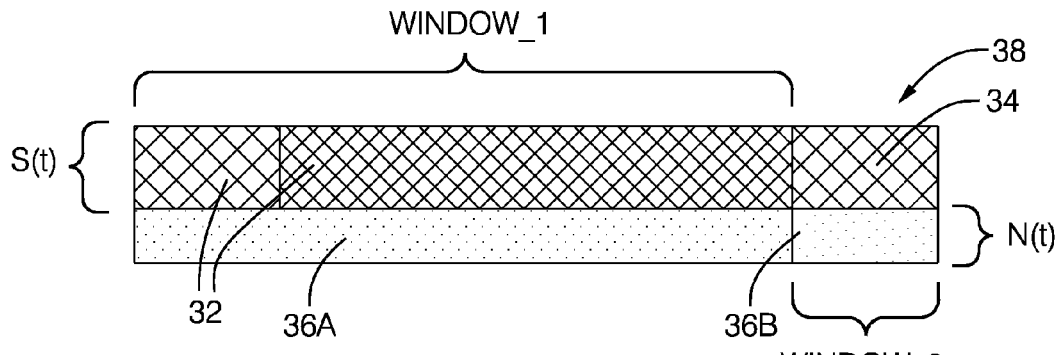
FIG. 4 is diagram of a signal present in the system of FIG. 1 in accordance with one embodiment.

FIG. 4 illustrates how windowing functions in the processor 24 may operate to select data sets for processing. In this example, WINDOW_1 is a first data set based on data samples taken during a first time window which corresponds to WINDOW_1 42 in FIG. 3, and WINDOW_2 is a second data set based on data samples taken during a second time window which corresponds to WINDOW_2 44 in FIG. 3. It is noted that the second time window (WINDOW_2 44) is selected so that the second data set includes repeated-data 34 not present in the first data set indicated by the first time window (WINDOW_1 42). Note that guard-noise 36B of the noise portion N(t) associated with WINDOW_2 is shaded to distinguish that noise from symbol-noise 36A associated with WINDOW_1 of the data block 38. As will be explained in more detail with regard to FIG. 10 below, it is not necessary that the first data set exclude any data from the guard interval, and likewise the second data set does not need to include the entire guard interval.

Continuing with the non-limiting example given above where the data block 38 is formed of 1280 samples, the data interval may be formed of 1024 data samples, so the guard interval may be the remaining 256 samples, and the time aligned windowed data may be represented by $$W1(t)=[S(t)+N(t)]*[U(t-0)-U(t-1024)], \quad \text{Eq. 2}$$

$$W2(t)=[S(t)+N(t)]*[U(t-1025)-U(t-1280)], \quad \text{Eq. 3}$$

where W1(t) and W2(t) correspond to the data present in WINDOW_1 42 and WINDOW_2 44, respectively, and U(t) is the well-known unit step function.

Figure 5:
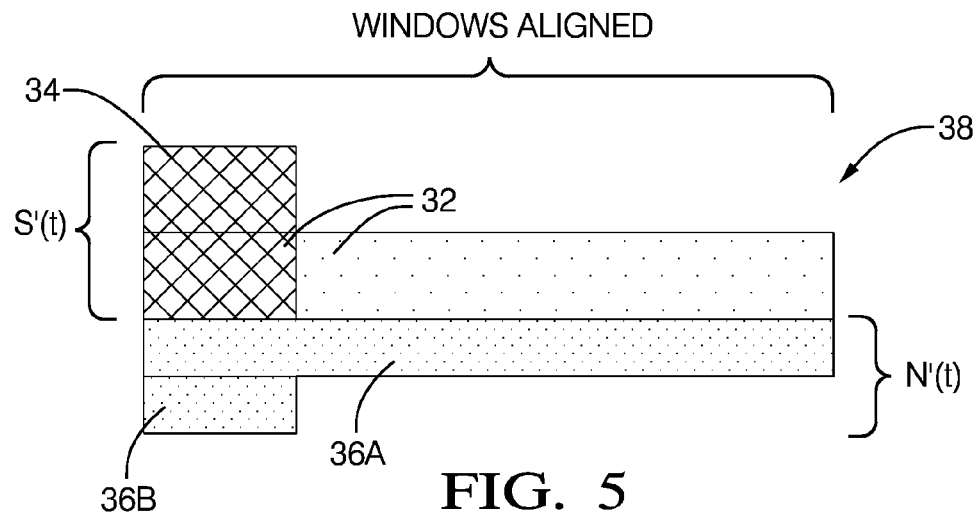
FIG. 5 is diagram of a signal present in the system of FIG. 1 in accordance with one embodiment.

FIG. 5 illustrates how a data from the two windows may be time aligned by a time alignment function illustrated in FIG. 3 as ALIGN 46. It is emphasized that the repeated-data 34 and the corresponding portion of the symbol-data 32 are the same data, and so are well correlated. In contrast, the guard-noise 36B and the corresponding portion of the symbol-noise 36A are not the same, for example are random noise, and so are not well correlated. Continuing with the non-limiting example given above, a time aligned symbol portion S'(t) and a time-aligned noise portion N'(t) may be represented by $$DB'(t)=S'(t)+N'(t)=W1(t)+W2(t-1024), \quad \text{Eq. 4}$$

where S'(t)+N'(t) combines data by way of maximal ratio combining (MRC) of the first data set and the time-aligned second data set, as suggested in FIG. 3 by the processing step of MRC 48.

Figure 6:
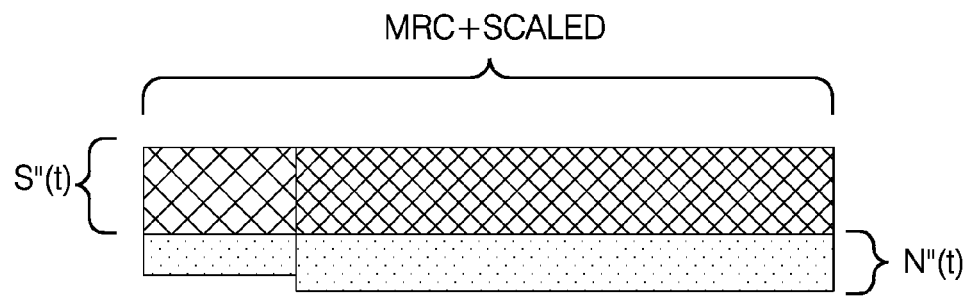
FIG. 6 is diagram of a signal present in the system of FIG. 1 in accordance with one embodiment.

FIG. 6 illustrates the signal S"(t) after being combined by the MRC 48, and scaled by SCALE 50. Since the repeated-data 34 and the corresponding portion of the symbol-data 32 are well correlated, the MRC 48 and SCALE 50 effectively maintain the energy available in the signal S"(t). However, since the guard-noise 36B and the corresponding portion of the symbol-noise 36A are not well correlated, indeed are statistically not correlated, the MRC and SCALE decreases the noise by a factor of the square-root of two divided by two ($\sqrt{2}/2 \approx 0.7$) in the portion of N"(t) that was combined. Continuing with the non-limiting example given above, a combined and scaled (i.e. normalized) data block DB"(t) that includes a normalized symbol portion S"(t) and a normalized noise portion N"(t) may be represented by $$DB"(t)S"(t) + N"(t), \quad \text{Eq. 4}$$

$$S"(t) = [S(t)] * [U(t-0) - U(t-1024)], \quad \text{Eq. 5}$$

$$N"(t) = [(1/\sqrt{2}) * N(t) * [U(t-0) - U(t-256)] + \quad \text{Eq. 6}$$
$$[N(t) * [U(t-257) - U(t-1024)],$$

where the factor $1/\sqrt{2}$ (approximately 0.707) is the relative reduction of noise data with respect to symbol data. As such, the processor 24 is configured to combine the first data set (WINDOW_1 42) and the second data set (WINDOW_2 44) in a manner effective to increase a signal-to-noise ratio of the signal 30. The normalized data block DB"(t) may be further processed by a fast Fourier transform (FFT 62) as will be recognized by those in the art.

Figure 7:
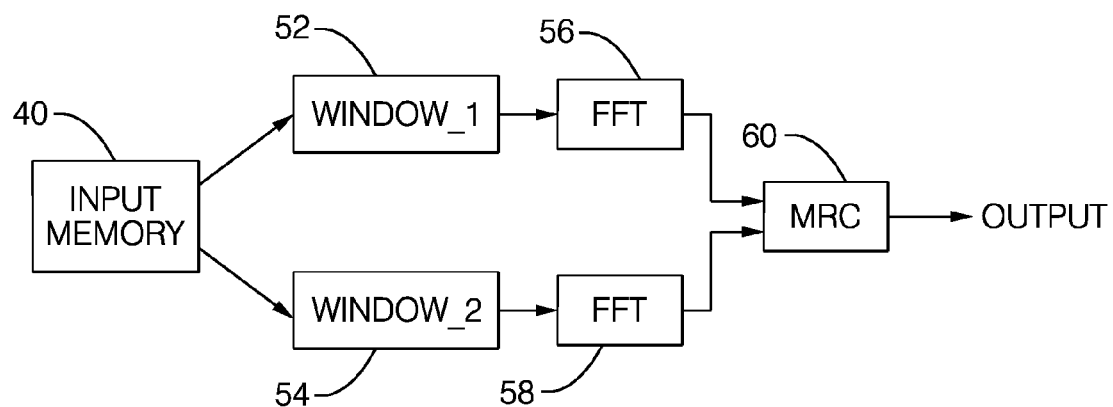
FIG. 7 is signal processing diagram for a receiver of the system of FIG. 1 in accordance with one embodiment.

FIG. 7 illustrates an alternative embodiment of a data flow diagram for the system and method described herein. The INPUT→MEMORY 40 may be similar to that describe in FIG. 3. In this example, the windowing functions WINDOW_1 52 and WINDOW_2 54 differ because the outputs feed fast Fourier transform function blocks FFT 56 and FFT 58, and so the time intervals or number of samples in the windows need to be the same so the Fourier transforms can be combined in the maximal ratio combining block (MRC 60) which also aligns the phase of output blocks FFT 56 and FFT 58.

Figure 8:
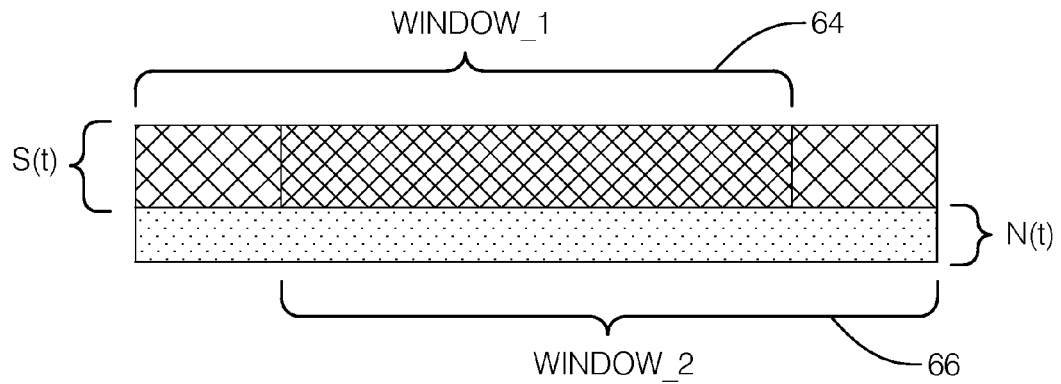
FIG. 8 is diagram of a signal present in the system of FIG. 1 in accordance with one embodiment.

FIG. 8 illustrates the sampling windows used to sample the data block 38, those being WINDOW_1 64 and WINDOW_2 66. Continuing with the non-limiting example given above where the data block 38 is formed of 1280 samples, the data interval may be formed of 1024 data samples, so the guard interval may be the remaining 256 samples, and the windows may be represented by $$W1(t)=[S(t)+N(t)]*[U(t-0)-U(t-1024)], \quad \text{Eq. 7}$$

$$W2(t)=[S(t)+N(t)]*[U(t-256)-U(t-1280)], \quad \text{Eq. 8}$$

where W1(t) and W2(t) correspond to the data present in WINDOW_1 64 and WINDOW_2 66, respectively, and U(t) is the well-known unit step function.

Since by definition, the cyclic prefix of suffix guard interval of the OFDM signal is the same information, then $$S(t)*[U(t-1024)-U(t-1280)]=S(t)*[U(t-0)-U(t-256)]. \quad \text{Eq. 9}$$

Figure 9:
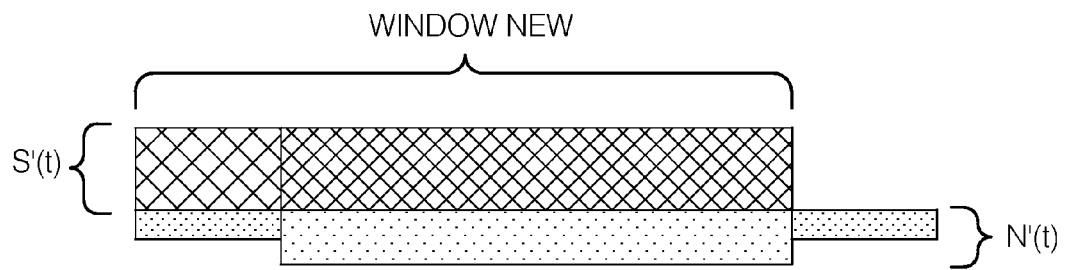
FIG. 9 is diagram of a signal present in the system of FIG. 1 in accordance with one embodiment.

Adding and substituting and scaling to normalize provides a new window represented by $$Wnew(t)=W1(t)+W2(t)=S(t)*[U(t-0)-U(t-1024)]+N(t)*[U(t-256)-U(t-1024)]+(\tfrac{1}{2})*N(t)*[U(t-0)-U(t-256)]+(\tfrac{1}{2})*N(t)*[U(t-1024)-U(t-1280)], \quad \text{Eq. 10}$$

as illustrated in FIG. 9

Since the noise in last two terms of Eq. 10 is not correlated, when the outputs of FFT 56 and FFT 58 are phase aligned and combined by MRC 60, the factor of $1/\sqrt{2}$ (approximately 0.707) is applied as shown in Eq. 6. As such, the equivalent noise data is reduced relative to the symbol data to the same degree by the signal processing configuration shown in FIG. 7 as is the case for the signal processing configuration shown in FIG. 3. It follows that the normalized data block DB"(t) output by the configuration shown in FIG. 7 is the same as shown in FIG. 6

Figure 10:
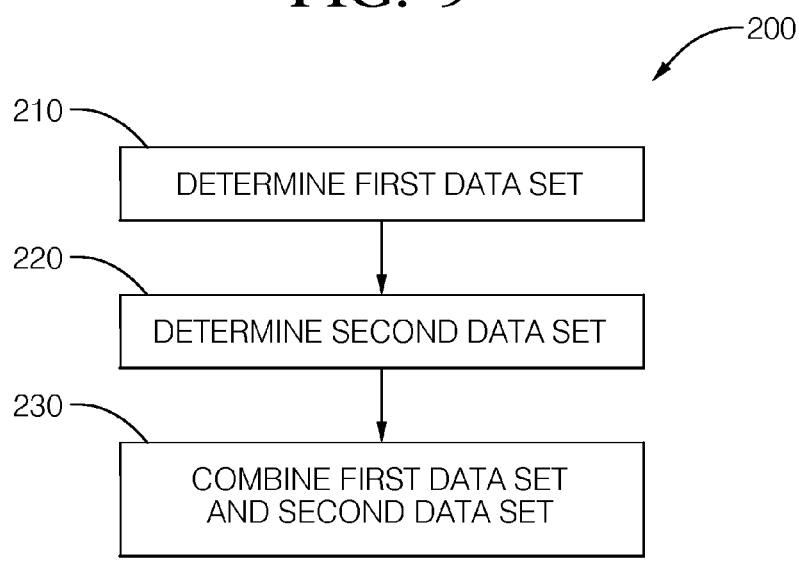
FIG. 10 is flowchart of a method executed by the system of FIG. 1 in accordance with one embodiment.

FIG. 10 illustrates a non-limiting example of a method 200 to decode an orthogonal frequency-division multiplex (OFDM) signal data block (the data block 38) that includes symbol-data in a data interval, repeated-data in a cyclic-prefix (CP) guard interval, and noise. Such a signal is commonly called a CP-OFDM signal.

Step 210, DETERMINE FIRST DATA SET, may include the processor 24 selecting or determining a first data set from the memory 28 which is based on data samples taken during a first time window (WINDOW_1) of the data block 38. In the examples above, the first data set corresponded to the symbol-data 32 which included the first samples of the data block 38. However, if multipath inference or other signal distortions make those first samples unusable or unreliable, the start of WINDOW_1 may be delayed. As such, the ending of WINDOW_1 may also be delayed so the first data set covers at least one full cycle of all the sub-carriers present in the CP-OFDM signal. For the purpose of further explanation, let N1 define the number of samples in the first data set, that is N1 is the number of samples in WINDOW_1. If, as suggested, the first samples taken by the input block (INPUT→MEMORY 40) were deemed to be corrupted or otherwise unusable, WINDOW_1 may be shifted so that the number of samples in WINDOW_1 (N1) is equal to the number of samples in the data interval of the signal 30 illustrated in FIG. 2.

Step 220, DETERMINE SECOND DATA SET, may include the processor 24 selecting or determining a second data set from the memory 28 which is based on data samples taken during a second time window (WINDOW_2) of the data block 38. A key aspect of determining which data is used is that the second time window is selected so that the second data set includes repeated-data not present in the first data set. If the second data set includes noise-data mixed in with whatever portion of the repeated-data 34 included in the second data set, then when the first data set and the second data set are combined as described elsewhere herein, the combining process increase the energy associated with the coherent portions of the signal portion S(t) more than the energy of the combined noise portions N(t) because the combined noise portions are not coherent.

Step 230, COMBINE FIRST DATA SET AND SECOND DATA SET, generally includes combining the first data set and the second data set in a manner effective to increase a signal-to-noise ratio of the signal 30. As described above with respect to FIG. 3, the combining may be by combining data that is in the time domain, and then converting the combined data into the frequency domain by way of the FFT 62. Alternatively, the combining may be as described above with respect to FIG. 7 where the first data set and the second data set are first transformed in to the frequency domain, and then combined. By way of example and not limitation, time domain or frequency domain data can be combined using maximal ratio combining (MRC).

Referring back to FIG. 3, the step of combining (230) the first data set and the second data set may include time-aligning the repeated-data 34 of the second data set not present in set first data set with the corresponding symbol data of the first data set using ALIGN 46, and determining a maximal ratio combining (MRC) of the first data set and the second data set with MRC 48.

Referring back to FIG. 7, the step of combining (230) the first data set and the second data set may include determining a first fast Fourier transform (first FFT) of the first data set with FFT 56, determining a second fast Fourier transform (second FFT) of the second data set with FFT 58, and determining a maximal ratio combining (MRC) of the first FFT and the second FFT with MRC 60, which includes phase aligning outputs FFT 56 and FFT 58.

If the data block 38 is not corrupted or otherwise degraded by, for example, multipath interference, the first data set may include only the symbol-data 32. N2 may then be equal to the number of samples in the guard interval of the signal, i.e. include the entire guard interval. However, if the data block is corrupted, then N2 may be less than the number of samples in the guard interval of the signal to minimize the amount of noise signal N(t) that may be coherently combined. If the size of guard interval were increased to be equal in size to the data interval, i.e. all the symbol-data 32 was transmitted twice so that the repeated data 34 was identical to the symbol-data 32, then N2 may be equal to N1. However, such as redundant transmission scheme is probably unnecessarily inefficient in many circumstances, and so it is generally preferable that guard interval of the signal 30 is shorter than the data interval of the signal 30. Furthermore, in general, to minimize overlap, it may be preferable for the first data set to contain the first N1 samples of the data block 38, and the second data set to contain the last N2 samples of the data block 38.

Accordingly, a communication system 10, a receiver 20 for the communication system 10 and a method 200 to decode an orthogonal frequency-division multiplex (OFDM) signal data block 38 is provided. The system 10, receiver 20, and method 200 are advantageous over the prior art because signal data present in the guard interval is used to increase the signal-to-noise ratio (SNR) of the signal 30. It is possible to do so because while the guard interval is formed of repeated data 34 which is in effect a redundant transmission of at least some of the symbol-data 32, the noise portion N(t) in the guard interval is not a duplication of the noise present in the corresponding portion of the data interval. As such, when data from the guard interval that is not present in the first data set (WINDOW_1) is properly combined with the second data set (WINDOW_2) the combined energy from the signal portion S(t) is greater than the combined energy from the noise portion N(t). In contrast, the prior art just ignores the data and noise portion N(t) of the guard interval.

While this invention has been described in terms of the preferred embodiments thereof, it is not intended to be so limited, but rather only to the extent set forth in the claims that follow.

I claim:

1. A method to decode an orthogonal frequency-division multiplex (OFDM) signal, said method comprising:
   receiving an OFDM signal, wherein the OFDM signal includes a data block characterized by symbol data in a data interval, repeated-data in a cyclic-prefix (CP) guard interval, and noise, wherein a portion of the symbol data is not repeated in the OFDM signal;
   determining a first data set based on data samples taken during a first time window of the data block;
   determining a second data set based on data samples taken during a second time window of the data block, wherein the second time window is selected so that the second data set includes repeated-data not present in the first data set; and
   combining the first data set and the second data set in a manner effective to increase a signal-to-noise ratio of the OFDM signal.

2. The method in accordance with claim 1, wherein the step of combining the first data set and the second data set includes time-aligning the repeated-data of the second data set not present in the first data set with the corresponding symbol data of the first data set, and determining a maximal ratio combining (MRC) of the first data set and the second data set.

3. The method in accordance with claim 1, wherein the step of combining the first data set and the second data set includes determining a first fast Fourier transform (first FFT) of the first data set, determining a second fast Fourier transform (second FFT) of the second data set, and determining a maximal ratio combining (MRC) of the first FFT and the second FFT.

4. The method in accordance with claim 1, wherein N1 defines a number of samples in the first data set, N2 defines a number of samples in the second data set.

5. The method in accordance with claim 4, wherein N1 is equal to the number of samples in the data interval of the signal.

6. The method in accordance with claim 5, wherein N2 is equal to the number of samples in the guard interval of the signal.

7. The method in accordance with claim 5, wherein N2 is less than the number of samples in the guard interval of the signal.

8. The method in accordance with claim 5, wherein N2 is equal to N1.

9. The method in accordance with claim 4, wherein the first data set contains the first N1 samples of the data block, and the second data set contains the last N2 samples of the data block.

10. The method in accordance with claim 1, wherein the guard interval of the signal is shorter than the data interval of the signal.

11. A receiver configured to decode an orthogonal frequency-division multiplex (OFDM) signal, said receiver comprising:
   a memory configured to store a first data set based on data samples taken during a first time window of a data block included in the OFDM signal and characterized by symbol data in a data interval, repeated-data in a cyclic-prefix (CP) guard interval, and noise, and a second data set based on data samples taken during a second time window of the data block, wherein the second time window is selected so that the second data set includes repeated-data not present in the first data set, and a portion of the symbol data is not repeated in the OFDM signal; and
   a processor configured to combine the first data set and the second data set in a manner effective to increase a signal-to-noise ratio of the signal.

12. The receiver in accordance with claim 11, wherein the processor is further configured to time-align the repeated-data of the second data set not present in the first data set with the corresponding symbol data of the first data set, and determine a maximal ratio combining (MRC) of the first data set and the second data set.

13. The receiver in accordance with claim 11, wherein the processor is further configured to determine a first fast Fourier transform (first FFT) of the first data set, determine a second fast Fourier transform (second FFT) of the second data set, and determine a maximal ratio combining (MRC) of the first FFT and the second FFT.

* * * * *